United States Patent
Garcia del Rio

(10) Patent No.: US 9,900,263 B2
(45) Date of Patent: Feb. 20, 2018

(54) NON-OVERLAY RESOURCE ACCESS IN DATACENTERS USING OVERLAY NETWORKS

(71) Applicant: Alcatel-Lucent USA, INC., Murray Hill, NJ (US)

(72) Inventor: Diego Garcia del Rio, San Francisco, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 550 days.

(21) Appl. No.: 14/500,327

(22) Filed: Sep. 29, 2014

(65) Prior Publication Data

US 2016/0094650 A1 Mar. 31, 2016

(51) Int. Cl.
*G06F 15/173* (2006.01)
*H04L 12/911* (2013.01)
*G06F 9/46* (2006.01)

(52) U.S. Cl.
CPC ............. *H04L 47/78* (2013.01); *G06F 9/46* (2013.01)

(58) Field of Classification Search
CPC ..... H04L 45/64; H04L 49/70; H04L 65/4084; H04L 12/185; H04L 67/1008; H04L 67/1002; G06F 9/45533; G06F 9/45558; G06F 2009/4557; G06F 2009/45595
See application file for complete search history.

(56) References Cited

U.S. PATENT DOCUMENTS

| 2004/0090966 | A1* | 5/2004 | Thomas | H04L 67/1008 370/395.52 |
|---|---|---|---|---|
| 2006/0187950 | A1* | 8/2006 | Bou-Diab | H04L 12/185 370/432 |
| 2009/0222517 | A1* | 9/2009 | Kalofonos | G06Q 10/10 709/204 |
| 2011/0176555 | A1* | 7/2011 | Poder | H04L 65/605 370/463 |
| 2011/0314119 | A1* | 12/2011 | Kakadia | H04L 29/12066 709/213 |
| 2013/0227108 | A1* | 8/2013 | Dunbar | H04L 12/4633 709/223 |
| 2013/0322443 | A1* | 12/2013 | Dunbar | H04L 12/185 370/390 |

(Continued)

OTHER PUBLICATIONS

Configuring a P+V Network for Neutron, Big Switch Networks, Apr. 2014.

(Continued)

*Primary Examiner* — Michael Y Won
*Assistant Examiner* — Muhammad Raza
(74) *Attorney, Agent, or Firm* — Kramer & Amado, P.C.

(57) ABSTRACT

Various embodiments relate to a method, device, and machine-readable storage medium including: exchanging messages between a virtual machine and the overlay network; identifying a request message transmitted by a virtual machine supported by the server as requesting an underlay resource that is inaccessible via the overlay network; sending a proxy request to the underlay resource via the underlay network; receiving, at the server, at least one message from the underlay resource in response to the proxy request; and forwarding the at least one message to the virtual machine based on determining that the virtual machine previously requested the underlay resource.

17 Claims, 6 Drawing Sheets

(56) References Cited

U.S. PATENT DOCUMENTS

| | | | |
|---|---|---|---|
| 2014/0123212 A1* | 5/2014 | Wanser | H04L 63/10 726/1 |
| 2014/0245302 A1* | 8/2014 | Zhu | G06F 9/45558 718/1 |
| 2014/0337497 A1* | 11/2014 | Wanser | H04L 41/0866 709/223 |
| 2015/0163192 A1* | 6/2015 | Jain | H04L 61/103 370/255 |
| 2015/0195137 A1* | 7/2015 | Kashyap | H04L 41/0893 370/254 |
| 2015/0195178 A1* | 7/2015 | Bhattacharya | H04L 45/745 718/1 |
| 2015/0244617 A1* | 8/2015 | Nakil | G06F 9/45558 709/224 |

OTHER PUBLICATIONS

Software-defined networking and network virtualization; Hewlett-Packard Development Company, L.P., Unifying the virtual overlay and physical underlay, Jun. 2014.

Triple Play Multicast; 7750 SR OS Triple Play Guide11.OR1, 2006-2012.

Stiliadis, "Network Virtualization: Overlay and Underlay Design", http://www.nuagenetworks.net/network-virtualization-overlay-underlay-design.Com, Jul. 16, 2013.

* cited by examiner

300

| | 310 | 320 | 330 |
|---|---|---|---|
| | MULTICAST GROUP | SUBSCRIBERS | VLAN |
| 340 | 224.14.25.14 | VM1 | 100 |
| 350 | 230.154.19.1 | VM1; VM2; CONTAINER 1 | 200 |
| 360 | ... | ... | ... |

400

| | 410 | 420 |
|---|---|---|
| | MAP NAME | WHITE LIST |
| 430 | MAP 1 | 224.14.0.0/16; 230.154.0.0/16 |
| 440 | MAP 2 | 230.0.0.0/8 |
| 450 | ... | ... |

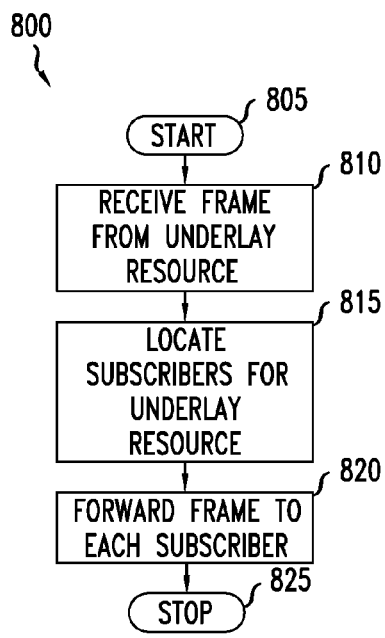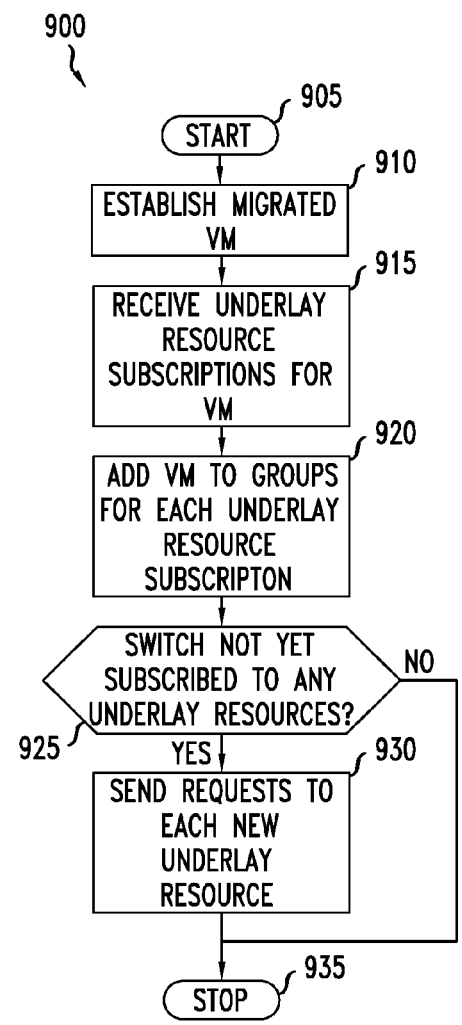

NON-OVERLAY RESOURCE ACCESS IN DATACENTERS USING OVERLAY NETWORKS

TECHNICAL FIELD

Various exemplary embodiments disclosed herein relate generally to network configuration and, more particularly but not exclusively, to software-defined networks and cloud computing.

BACKGROUND

Current datacenter overlay networking technologies isolate virtual machines from the physical network infrastructure and prevent them from accessing resources readily available in said underlay. For example, multicast streams already being transported in this underlay become unreachable for the virtual machines using the overlay network.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a non-transitory computer-readable storage medium encoded with instructions for execution by a server, the non-transitory computer-readable storage medium comprising: instructions for supporting a plurality of virtual machines; instructions for providing a virtual switch between the virtual machines and a datacenter network, wherein the datacenter network includes an overlay network supported by an underlay network; instructions for monitoring traffic by the virtual switch to identify virtual machine requests for underlay resources which are inaccessible via the overlay network; and instructions for providing an underlay resource proxy for the virtual machines, including: instructions for sending proxy requests to underlay resources via the datacenter network on behalf of virtual machines identified as requesting underlay resources, whereby the proxy requests identify the underlay resource proxy as a requestor, and instructions for forwarding underlay resource responses to virtual machines that previously requested associated underlay resources.

Various embodiments described herein relate to a method performed by a server in a data center comprising an overlay network supported by an underlay network, the method comprising: exchanging messages between a virtual machine and the overlay network; identifying a request message transmitted by a virtual machine supported by the server as requesting an underlay resource that is inaccessible via the overlay network; sending a proxy request to the underlay resource via the underlay network; receiving, at the server, at least one message from the underlay resource in response to the proxy request; and forwarding the at least one message to the virtual machine based on determining that the virtual machine previously requested the underlay resource.

Various embodiments described herein relate to a server for deployment in a datacenter, the server comprising: a network interface configured to communicate with a datacenter network that includes an overlay network supported by an underlay network; a memory; and a processor in communication with the network interface and the memory, wherein the processor is configured to: support a plurality of virtual machines; provide a virtual switch between the virtual machines and a datacenter network, wherein the datacenter network includes an overlay network supported by an underlay network; monitor traffic by the virtual switch to identify virtual machine requests for underlay resources which are inaccessible via the overlay network; and provide an underlay resource proxy for the virtual machines, configured to: send proxy requests to underlay resources via the datacenter network on behalf of virtual machines identified as requesting underlay resources, whereby the proxy requests identify the underlay resource proxy as a requestor, and forward underlay resource responses to virtual machines that previously requested associated underlay resources.

Various embodiments are described wherein: the underlay resource comprises a multicast source; the request message and the proxy request comprise requests to join a multicast group of the multicast source; and the at least one message from the underlay resource comprises multicast traffic from the multicast source.

Various embodiments additionally include identifying an additional request message transmitted by an additional virtual machine supported by the server as requesting the underlay resource; and forwarding the at least one message to the additional virtual machine based on determining that the additional virtual machine previously requested the underlay resource.

Various embodiments additionally include instructions for retrieving policy data from a policy server; instructions for, after identifying a virtual machine request for an underlay resource, determining whether a requestor virtual machine is authorized to access the requested underlay resource, wherein the instructions for providing an underlay resource proxy for the virtual machines further include instructions for denying proxy functionality when the requestor virtual machine is not authorized to access the requested underlay resource.

Various embodiments additionally include instructions for maintaining correspondences between virtual machines and underlay resources to which respective virtual machines are subscribed, wherein the instructions for sending proxy requests to underlay resources via the datacenter network on behalf of virtual machines are configured to be performed when the correspondences indicate that no virtual machines were subscribed to a respective underlay resource prior to the virtual switch receiving a virtual machine request for the underlay resource.

Various embodiments additionally include instructions for identifying virtual machine requests to end sessions with underlay resources; instructions for, upon identifying a virtual machine request to end a session with an underlay resource, deleting a correspondence between the virtual machine and the underlay resource; instructions for determining whether, after deleting the correspondence between the virtual machine and the underlay resource, the correspondences indicate that no virtual machine remains subscribed to the underlay resource; and instructions for, when the correspondences indicate that no virtual machine remains subscribed to the underlay resource, sending a proxy request to end the session between the underlay resource proxy and the underlay resource.

Various embodiments additionally include instructions for, after sending a proxy request, sending virtual machine subscription information to a network controller; and instructions for establishing a migrated virtual machine on the server, including: instructions for receiving virtual machine subscription information for the migrated virtual machine from the network controller, and instructions for executing the instructions for sending proxy requests to underlay resources based on the received virtual machine subscription information for the migrated virtual machine.

Various embodiments additionally include instructions for establishing a migrated virtual machine on the server, including: instructions for transmitting a query to the migrated virtual machine, instructions for receiving virtual machine subscription information from the virtual machine in response to the query, and instructions for executing the instructions for sending proxy requests to underlay resources based on the received virtual machine subscription information for the migrated virtual machine.

BRIEF DESCRIPTION OF THE DRAWINGS

In order to better understand various exemplary embodiments, reference is made to the accompanying drawings, wherein:

FIG. 8 illustrates an exemplary method for processing frames received from underlay resources; and FIG. 9 illustrates an exemplary method for migrating virtual machines.

To facilitate understanding, identical reference numerals have been used to designate elements having substantially the same or similar structure or substantially the same or similar function.

DETAILED DESCRIPTION

No satisfactory solutions exist to provide devices tied to an overlay network with access to resources available only through the underlay network, mainly due to the relative recentness of the overlay networking technology. Accordingly, various methods and systems are described to provide such access to the underlay network. In particular, various embodiments described herein establish a virtual switch in a hypervisor as a core component in an overlay network. The virtual switch also has access to the multicast traffic available directly on the hypervisor by means of the physical network infrastructure. The virtual switch receives the multicast traffic from the underlay (for example, on demand, by requesting it by means of an IGMP (Internet Group Management Protocol) message to the physical network). The virtual switch will monitor, on specific virtual machines as defined by a central policy controller, the requests of these virtual machines to join specific groups. The requests are then matched against a white-list to determine which specific groups can be joined by which specific virtual machines and, if authorized, the virtual switch will allow the streaming of the specific multicast IP flow (Internet Protocol) to the interested virtual machine(s). The virtual switch will act as an IGMP proxy to the physical underlay network, hiding the specific IP addresses or number of virtual machines from the underlay network, appearing as a single host that is requesting one or more channels.

It will be apparent that the foregoing description is a summary of some embodiments and that various other embodiments may differ in various respects. For example, some embodiments may access underlay resources other than multicast data sources. Such alternative underlay resources may include common resources within the data center or resources located on the Internet when the overlay network is not provided with Internet access. Various modifications to realize such alternative arrangements will be apparent.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
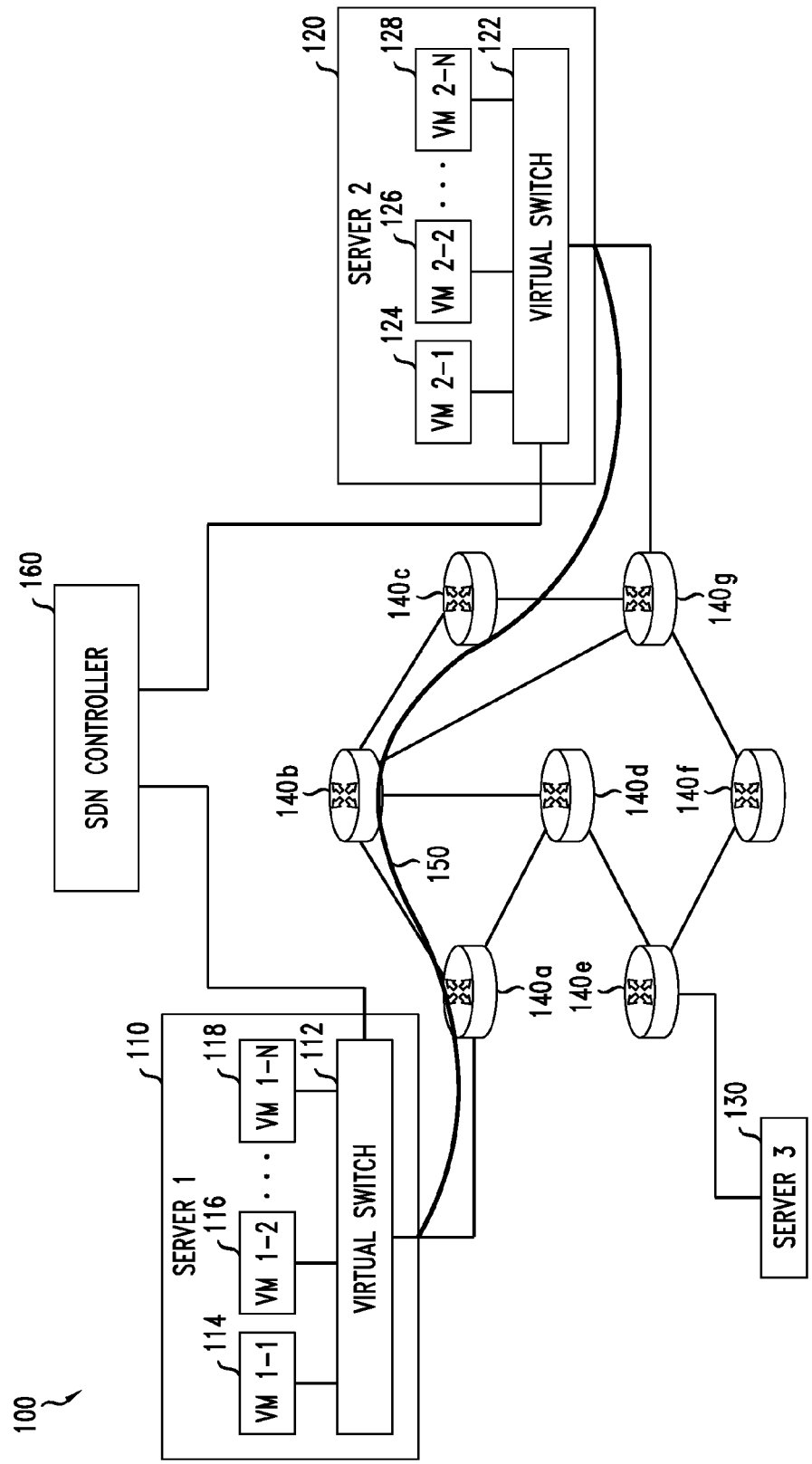
FIG. 1 illustrates an exemplary environment for providing access to underlay resources.

FIG. 1 illustrates an exemplary network environment 100 for providing access to underlay resources. The network 100 may be a cloud computing network or a portion thereof. It will be apparent that various alternative arrangements may be used such as, for example, alternative networks including additional servers or additional routers.

As shown, the network includes three servers 110, 120, 130 interconnected by a core network of routers 140. In various embodiments, the core nodes 140 are conventional switches configured to facilitate communication between multiple servers within a data center or between multiple data centers. Various alternatives for the core nodes 140 will be apparent such as, for example, conventional routers or SDN switches/routers. Accordingly, in various embodiments, the core nodes 140 may span a large network such as the Internet. The servers 110, 120, 130 may be located in the same data center as each other or may be geographically separated. At least two servers 110, 120 support a multiple virtual machines (VMs) 114-118, 124-128 along with respective hypervisors and virtual switches 112, 122. The VMs 114-118, 124-128 may belong to various cloud tenants and, as such, may implement various applications as designed by the respective cloud tenants. For example, a first tenant may wish to deploy a web service and may configure VM 1-1 114 and VM 2-2 126 as web servers and VM 1-2 116 as a backend database for use by the web servers. Various additional applications and virtual machine types will be apparent. In various configurations, the VMs 114-118, 124-128 may initiate and receive communications between each other and other network devices. As such, the VMs 114-118, 124-128 may be considered "endpoints." As will be understood, an endpoint may be any entity which sends and receives Ethernet frames or other datagrams. Endpoints can either be VMs or physical machines. Each endpoint may belong to a tenant and multiple tenants may share the same network infrastructure.

The hypervisors may be processes running on the respective servers 110, 120 that perform various management functions with respect to the virtual machines 114-118, 124-128. For example, the hypervisor may create, schedule, and direct execution of respective VMs. Additionally, the hypervisor may provide a virtual switch 112, 122 as an intermediate network device situated in the data path between the virtual machines 114-118, 124-128 and the core network 140. As such, the virtual switches 112, 122 may constitute hypervisor edge switches within the network. In other words, when VM 2-2 126 wishes to transmit a frame of data to VM 1-2 116, VM 2-2 126 first transmits this frame to the virtual switch 122, which forwards the frame over the core network 140 to the other virtual switch 112, which then forwards the frame to the appropriate VM 1-2 116. As will be understood an edge switch or other edge device may be any Ethernet or other protocol switch to which endpoints connect. It will be understood that in various embodiments, one or more of the VMs 114-118, 124-128 may be containers and that the respective hypervisor may operate as an operating system for any such containers.

In various embodiments, the virtual switches 112, 122 are implemented as, or otherwise provided with, software-defined network (SDN) switches. In other words, an SDN controller 160 may transmit configuration information to the virtual switches 112, 122 to instruct the virtual switches 112, 122 as to how different traffic should be handled. For example, the SDN controller 160 may configure virtual switch 122 to drop any frames sent by VM 2-2 124 to VM 2-1 122 or VM 1-N 118 if these VMs are associated with different cloud tenants to provide cross-tenant traffic isolation.

The SDN controller 160 may be virtually any device or federation of multiple devices capable of configuring the virtual switches 112, 122 according to various SDN conventions. In some embodiments, the SDN controller 160 may be one of the virtual machines 114-118, 124-128 or another standalone device in communication with the core network 140. In various embodiments the SDN controller is a logically centralized entity capable of programming edge switches to perform various functions such as network address translation (NAT), tunneling (e.g., adding encapsulation headers) network messages on a per flow basis, or adding and removing VLAN tags from such messages. The SDN controller 160 may also be aware of the topology of the entire network, including core switches and may interface with a Network Management System (NMS) (not shown) which may inform the SDN controller 160 of the state of overload of each core switch. In some embodiments, the network 100 may additionally include a policy server (not shown), as will be explained below with respect to FIG. 2. For example, a policy server may be implemented as part of the SDN controller 160 or as a separate device in communication with the SDN controller 160.

As shown, the core network 140 supports an overlay network 150. Specifically, the overlay network 150 includes a point-to-point connection between the virtual switches 112, 122. It will be understood that, in various embodiments, the overlay network 150 may include additional point-to-point connections and, as such, may be more complex than illustrated. The overlay network 150 thus facilitates communication between the virtual switches 112, 122 and the VMs 114-118, 124-128 attached thereto. As will be understood, the virtual switches 112, 122 may receive outgoing traffic from VMs 114-118, 124-128 and encapsulate the frames (e.g., using MAC-in-MAC, VXLAN, or other form of encapsulation) for transmission over the overlay network 150. Because the core network 140 supports the overlay network, it may be referred to as an "underlay network."

As shown, at least one server 130 does not connect to the overlay network 150. In other words, there is no point-to-point connection established between server 3 130 and either of the virtual switches 112, 122. As such, the VMs 114-118, 124-128 may not access the server 130 via the overlay network 150; instead, as illustrated, traffic must traverse the underlay network 140 to reach the sever 3 130. As such, the server 130, or services provided thereby, may be referred to as an "underlay resource." Various types of underlay resources will be apparent such as multicast sources, Internet servers, common datacenter services, etc. The various exemplary embodiments described herein will be described with respect to multicast underlay resources such as, for example, Internet group management protocol (IGMP) routers; various modifications for supporting alternative or additional types of underlay resources will be apparent.

To provide the VMs 114-118, 124-128 with access to the underlay resource 130, the virtual switches may include or otherwise act as a proxy for requesting VMs 114-118, 124-128. According to various embodiments, the virtual switches 112, 122 may perform IGMP snooping to identify outgoing IGMP join requests from attached VMs 114-118, 124-128. Rather than forwarding IGMP join requests over the overlay network 150 as with other traffic, the virtual switch 112, 122 sends its own IGMP join request to the multicast source, such as server 3 130, over the underlay network 140. Thereafter, according to standard IGMP implementations, the multicast source will begin to send the joined multicast data stream back to the virtual switch 112, 122 over the underlay network 140. Then, the virtual switch 112, 122 determines which VMs 114-118, 124-128 are subscribed to the data stream and forwards the received traffic accordingly. Various additional features and alternative embodiments will be described in greater detail below with respect to FIGS. 2-9.

Figure 2:
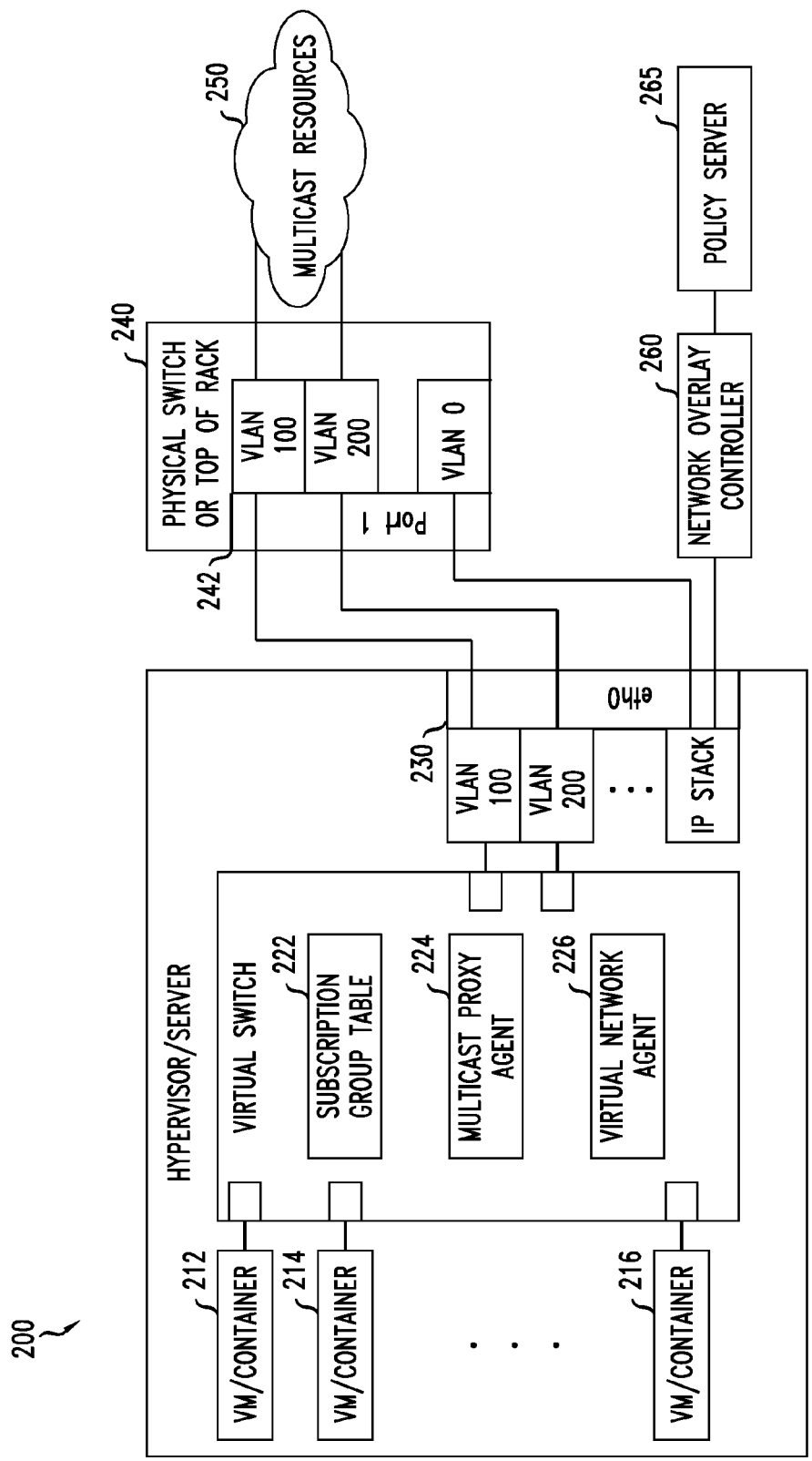
FIG. 2 illustrates an exemplary system for providing access to underlay resources.

FIG. 2 illustrates an exemplary system 200 for providing access to underlay resources. As shown, the system includes a server running a hypervisor 210 in communication with a physical switch or top of rack (TOR) switch 240, one or more multicast resources 250, a network overlay controller 260, and a policy server 265. The server 210 may correspond to one or more of the servers 110, 120 of FIG. 1. The switch 240 may be a switch within the underlay network 140 while the multicast resources 250 may include one or more underlay resources such as server 3 130.

The policy server 265 may be a device that performs various functions such as managing the access and attachment of VMs to the virtual overlay network. The network overlay controller 260 may be a device that acts as an intermediary between the server 210 and the policy server 265 and configurations of the various virtual switches participating in the overlay network. In various embodiments, the network overlay controller 260 and policy server 265 may be implemented as a single device such as, for example, the SDN controller 160 of FIG. 1.

As shown, the server 210 supports multiple virtual machines or containers 212-216. As will be understood, a container may be tenant virtual devices that, unlike virtual machines, share an operating system with the server 210 or another virtual device. As used herein, the terms "virtual machine" and "VM" will be understood to encompass containers in addition to standard virtual machines. The VMs 212-216 implement virtual network interfaces which connect to a virtual switch 220. The virtual switch 220 additionally connects to one or more physical network interfaces 230 (such as, for example, and Ethernet interface with an IP stack) via which other routers, switches, and devices are accessible. For example, the virtual switch 220 may exchange traffic between the VMs 212-216 and an overlay network. The physical interface 230 and the port 242 of the TOR 240 implement one or more virtual local area networks (VLAN) therebetween. As shown, VLAN 100 and VLAN 200 are established and may be dedicated to carrying IGMP traffic between the two devices 210, 240.

As explained above, in various embodiments the virtual switch 220 recognizes outgoing requests for underlay resources, such as multicast resources 250, and instead of forwarding such requests over the overlay network, acts as a proxy for the requesting VM(s) 212-216. To provide or otherwise support such proxy functionality, the virtual switch 220 includes a subscription group table 222, multicast proxy agent 224, and virtual network agent 226. Upon establishment of a new VM 212-216 by the hypervisor 210, the virtual network agent 226 retrieves or otherwise receives permissions information from the policy server 265 indicating which underlay resources the new VM is authorized to access. For example, upon establishment of a new VM, the virtual network agent 226 may send a request for multicast access rules and policy from the policy server including a unique identifier for the VM or an application or tenant to which the VM belongs. As will be described in greater detail below with respect to FIGS. 4-5, the policy server 265 may then provide a white list of allowable multicast IP ranges for the new VM. If a virtual machine or container is not authorized to receive any multicast traffic, the VM may be attached to the overlay network such that all outgoing traffic is sent over the overlay network. Where the policy specifies that multicast traffic can be received, the virtual switch will note this capability, as well as the list of allowed groups to be joined, as part of the reference information for the virtual machine. The list of groups that a virtual machine can join can be specified as either (*,G) groups or (S,G) groups. Groups of type (*,G) allow the client to join the specific group G as sourced by any random source in the network (thus the use of * as a wildcard). For groups specified as S,G, the virtual machine or client can request a specific group G, sourced by a specific Source S. This type of request is known in the field as an IGMPv3 request of type (S,G). In various embodiments, the system supports both types of requests.

In various embodiments, the list of groups that a virtual machine is authorized request may be updated any time by means of a policy update message sent by the policy server. This can be due to an external system changing the rules and permissions of the specific virtual machine or some group to which the virtual machine belongs. The virtual machine could also be deprived of the right to join multicast groups entirely or, in the reverse case, if it had no rights to join groups, a policy update can assign the new permissions. These policy updates may not require any form of re-start or re-connection of the virtual machine whose policy is being updated or modified; instead, the updates may simply be provided to the virtual network agent 226. Existing multicast subscriptions may then be reevaluated against the updated rules by the multicast proxy agent and, if not longer authorized, terminated.

The virtual switch 220 may be configured to snoop or otherwise monitor outgoing traffic to identify IGMP join messages transmitted by the VMs 212-216 and to subsequently redirect such messages to the multicast proxy agent 224. For example, when a VM 212-216 has been authorized to receive multicast traffic, the virtual switch 220 will set up a rule that will capture and process any IGMP packets being sent from the virtual machine. These IGMP messages are sent by the virtual machine 212-216 when one of the applications running in it requests to join a specific multicast group.

The IGMP messages are captured by the virtual switch and processed by a multicast agent or multicast proxy that is part of the virtual switch. The multicast proxy agent 224 then checks the permissions for the VM to determine whether the requested multicast stream is allowed for the requesting VM. Specifically, when the IGMP join message is received by the multicast proxy agent 224, it analyzes the list of groups that the virtual machine is requesting to join and compares these to the list of allowed groups that the policy server has provided. For the groups that match the permitted list, the multicast agent will install a forwarding entry in the virtual switch that specifies that traffic destined for the specific group G (and, if specified, matching the specific Source S). These entries in the virtual switch will replicate traffic received on the dedicated multicast interface coming from the physical switch or TOR (Top Of Rack) and send it to the interested virtual machines. The virtual switch 220 adds the requesting VM to the subscription group table 222 as a subscriber to the requested multicast stream. Additionally, if the virtual switch 220 itself is not already subscribed to the requested resource, the virtual switch constructs a new IGMP join request for transmission, via the TOR 240 to the appropriate multicast resource 250.

Thereafter, the multicast resource 250 will stream the requested multicast data back to the virtual switch 220 via the TOR 240 via one of the multicast-dedicated VLANs. The traffic arriving over one of these VLANs is first received by the multicast proxy agent 224. The multicast proxy agent 224 then refers to the subscription group table 222 to identify any attached VMs 212-216 that have subscribed to the received stream and subsequently forwards the stream to each identified VM 212-216 via their respective virtual NICs. As such, the subscription group table serves as an identification or correlation of VMs that are subscribed to underlay resources.

For each VM requesting to join a specific group, the multicast proxy agent 224 will perform the duties of an IGMP proxy agent. That is, the multicast proxy agent 224 keeps track of the requested groups by the virtual machines or clients and for each group requested by at least one VM or client, will send a corresponding IGMP join towards the physical infrastructure or TOR on the dedicated VLAN corresponding to the group in question. The IGMP join sent towards the physical network is sourced with an IP address configured in the virtual switch 220 or hypervisor 210, thus hiding from the physical infrastructure the real number of virtual machines that are connected "behind" the virtual switch 220. The source address used for the join packets sent "upstream" to the physical top of rack may also be set to 0.0.0.0 if the physical infrastructure supports it. The IGMP proxy process may also perform two additional functions: responding to IGMP queries from the upstream switch or TOR, thus refreshing the requested groups from the underlay, and sending periodic queries towards the virtual machines 212-216 to refresh the join list from the VMs. This set of generic queries to the virtual machines are aimed to keep the list of interested parties for each specific group up to date.

As will be understood, multiple VLANs between two points may nonetheless traverse different sets of intermediate devices. As such, traffic between two points may be more evenly distributed over a network by dividing different traffic streams among multiple VLANs. Specifically, such a configuration may result in a lower processing load being placed on one or more intermediate nodes. Various embodiments described herein may leverage this functionality by assigning different multicast streams to different VLANs. For example, if the multicast proxy agent 224 has subscribed to six different multicast streams, the multicast proxy agent 224 may establish three of these streams over VLAN 100 and the remaining three over VLAN 200. Various techniques for optimizing the distribution of traffic over two or more VLANs will be apparent.

Figures 3, 4, 5:
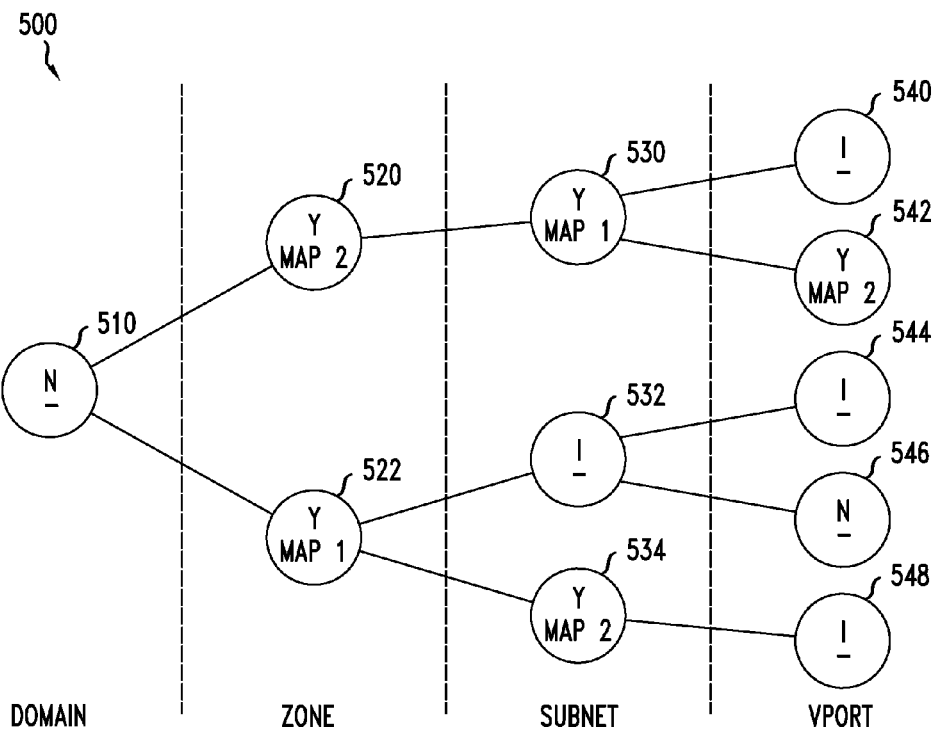
FIG. 3 illustrates an exemplary data arrangement for storing underlay resource subscription information.
FIG. 4 illustrates an exemplary data arrangement for storing underlay resource permissions maps.
FIG. 5 illustrates an exemplary data arrangement for correlating underlay resource permissions maps to individual virtual machines.

FIG. 3 illustrates an exemplary data arrangement 300 for storing underlay resource subscription information. As will be understood, the data arrangement 300 may be an abstraction and may be stored in virtually any appropriate form. For example, the data arrangement may be stored as a table, array, linked list, tree, other data structure, or combinations of multiple such data structures. Further, additional or alternative fields may be included in the data arrangement 300. In various embodiments, the data arrangement 300 may describe the configuration of the subscription group table 222 of FIG. 2.

As shown, the data arrangement 300 defines a multicast group field 310, a subscribers field 320, and a VLAN field 330. The multicast group field 310 identifies a multicast stream by the IP address of the multicast stream. The subscribers field 320 identifies the VMs that are subscribed to the multicast stream. The VLAN field 330 identifies the VLAN over which the associated multicast stream will be delivered.

As a first example, subscription record 340 indicates that a multicast data stream identified by IP address 224.14.25.14 will arrive over VLAN 100 and should be directed to VM1. As a second example, subscription record 350 indicates that a multicast data stream identified by IP address 230.154.19.1 will arrive over VLAN 200 and should be directed individually to each of VM1, VM2, and Container 1. The data arrangement 300 may include numerous additional records 360.

FIG. 4 illustrates an exemplary data arrangement 400 for storing underlay resource permissions maps. As will be understood, the data arrangement 400 may be an abstraction and may be stored in virtually any appropriate form. For example, the data arrangement may be stored as a table, array, linked list, tree, bitfield, other data structure, or combinations of multiple such data structures. Further, additional or alternative fields may be included in the data arrangement 400. The data arrangement 400 may describe at least some of the permissions information retrieved by the virtual switch 220 from the policy server 265.

As shown, the data arrangement 400 includes a map name field 410 specifying a handle for the map and a white list 420 specifying the multicast IP addresses (or prefixes thereof or ranges between specified start and end addresses) to which a VM assigned to the map is allowed to subscribe. As will be understood, the data arrangement may additionally or alternatively provide a black list of IP addresses that a VM is explicitly disallowed from joining or virtually any other data useful for defining access permissions to the underlay resources. As a first example, map 430, identified as "MAP 1," indicates that associated VMs may join any multicast streams having an IP of prefix 224.14.0.0/16 or 230.154.0.0/16. As a second example, map 440, identified as "MAP 2," indicates that associated VMs may join any multicast streams having an IP of prefix 230.0.0.0/8. The data arrangement 400 may include numerous additional maps 450.

In various embodiments, the maps may be tied explicitly to VMs. For example, instead of map name field 410, the data arrangement may have a VM field indicating one or multiple VMs to which the white list applies. As another example, a VM may be associated elsewhere, such as in another data arrangement or in a VM configuration, with a map name. In other embodiments, the switch may be additionally provided with a hierarchy indicating to which VMs each map applies.

FIG. 5 illustrates an exemplary data arrangement 500 for correlating underlay resource permissions maps to individual virtual machines. As will be understood, the data arrangement 500 may be an abstraction and may be stored in virtually any appropriate form. For example, the data arrangement may be stored as a table, array, linked list, tree, bitfield, other data structure, or combinations of multiple such data structures.

The data arrangement 500 illustrates a number of nodes within a network system, hierarchically arranged among four different levels. The lowest hierarchy level, VPORT, corresponds to VMs (this mapping is usually done by external systems by means of an Application programming interface or similar construct). Subnets correspond to specific IP networks while zones are groups of networks. The highest level, domain, is the sum of those networks as they could be routed. The domain corresponds to a construct similar to an IP VPN (Virtual Private Network) with multiple subnets that can communicate between each other by means of routing.

Each element at each level is shown to specify two pieces of information: a flag and a map. The flag indicates whether a map to be assigned at that level while the map indicates which map is to be assigned. The flag may take on three different values: an "N" indicating that no map is to be applied at the associated level and node, a "Y" indicating that the specified map is to be applied at the associated level and node, and an "I" indicating that a map defined by the parent node (or grandparent node, great grandparent node, etc.) is to be applied at the associated level and node.

For example, node 510 indicates that no map is defined for the entire domain, while nodes 520 and 522 indicate that MAP 2 and MAP 1, respectively, are to be applied to the two zones within the domain. Unless overridden by, for example, an N flag at a lower level node, these are the maps that will be applied to respective VMs within the two zones. For example, node 532 at the subnet level and node 544 at the VM level both indicate that the map is to be inherited and, as such, MAP 2 will be applied to the VM associated with node 544. Node 546, on the other hand, indicates that no map will be applied to the VM associated with node 546 and, as such, the specification of MAP 2 at node 520 is overridden.

Map specifications may also be overridden by specification of alternative maps. For example, node 530 overrides node 520 by specifying with the Y flag that MAP 1 is to be used for that associated subnet. MAP 1 is then inherited by the VM associated with node 540. Node 542, however, overrides node 530, by specifying that the VM associated therewith will be bound to MAP 2.

In some embodiments, multiple maps may be combined. For example, node 534 indicates that the node 522 specification of MAP 1 will be inherited but also that MAP 2 will be applied to the associated subnet. This configuration will then be inherited by the VM associated with node 548. Various embodiments may combine maps in multiple possible manners. For example, the two maps may be combined using a logical OR such that any whitelisted range in either map is whitelisted in the combined map. Alternatively, the two maps may be combined using a logical AND such that only whitelisted ranges existing in both maps are whitelisted in the combined map.

In various embodiments, the hierarchy described in FIG. 5 may be made available to the virtual switch by the policy server for use in determining which VMs should be associated with which maps for the purposes of determining permissions for accessing underlay resources. Alternatively, the policy server may not share the hierarchy with other nodes and, instead, may interpret the hierarchy itself upon request for permissions of a given VM to identify and return only the appropriate white list or other permissions for that VM.

Figure 6:
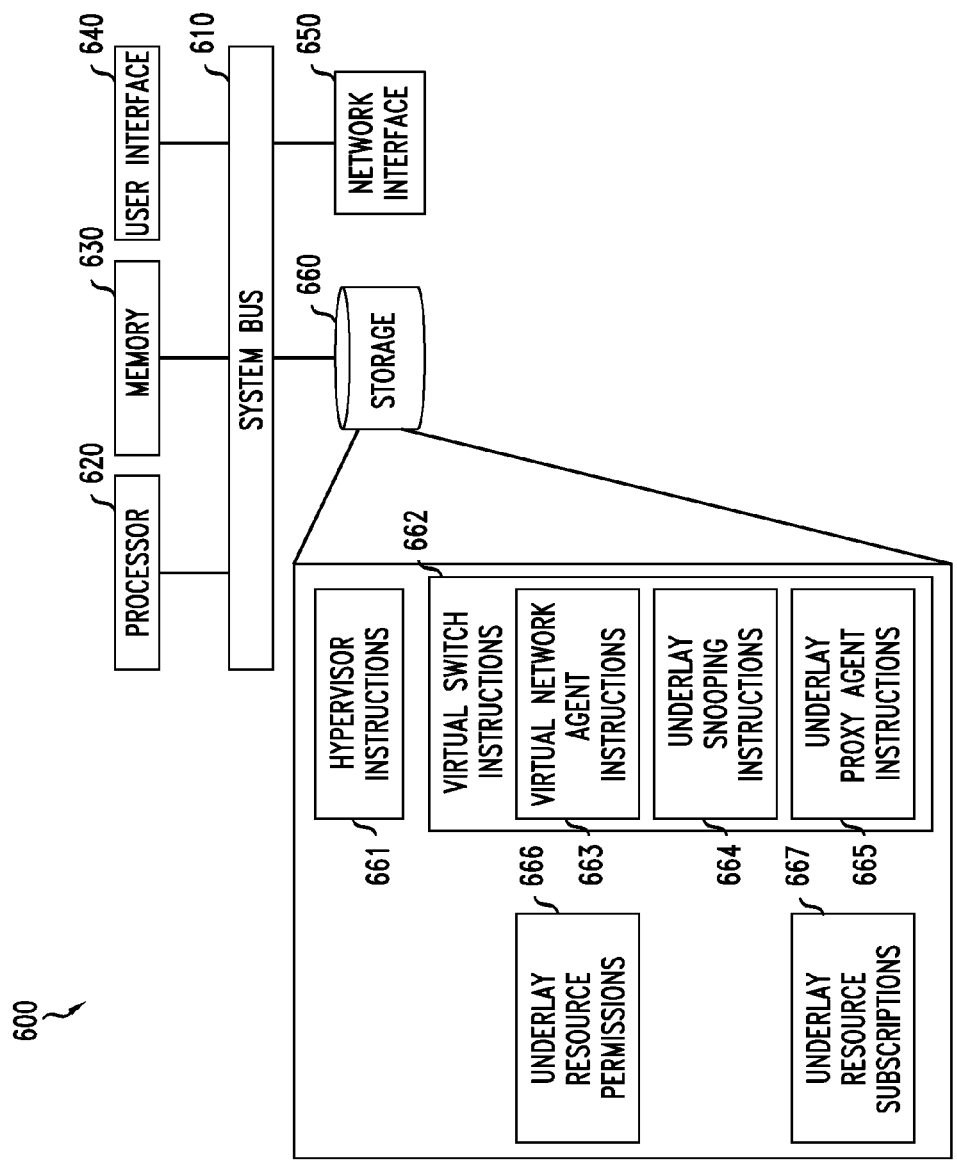
FIG. 6 illustrates an exemplary hardware diagram for implementing a datacenter server.

FIG. 6 illustrates an exemplary hardware diagram 600 for implementing a datacenter server. The exemplary hardware 600 may correspond to one or more of the servers 110,120 of FIG. 1 or the server 210 of FIG. 2. It will be apparent that a similar hardware arrangement may be used to implement other devices of the exemplary networks 100, 200 described herein such as, for example, the server 3 130, SDN controller 160, TOR 240, multicast resources 250, network overlay controller 260, or policy server 265. As shown, the device 600 includes a processor 620, memory 630, user interface 640, network interface 650, and storage 660 interconnected via one or more system buses 610. It will be understood that FIG. 6 constitutes, in some respects, an abstraction and that the actual organization of the components of the device 600 may be more complex than illustrated.

The processor 620 may be any hardware device capable of executing instructions stored in memory 630 or storage 660 or otherwise processing data. As such, the processor may include a microprocessor, field programmable gate array (FPGA), application-specific integrated circuit (ASIC), or other similar devices.

The memory 630 may include various memories such as, for example L1, L2, or L3 cache or system memory. As such, the memory 630 may include static random access memory (SRAM), dynamic RAM (DRAM), flash memory, read only memory (ROM), or other similar memory devices.

The user interface 640 may include one or more devices for enabling communication with a user such as an administrator. For example, the user interface 640 may include a display, a mouse, and a keyboard for receiving user commands. In some embodiments, the user interface 640 may include a command line interface or graphical user interface that may be presented to a remote terminal via the network interface 650.

The network interface 650 may include one or more devices for enabling communication with other hardware devices. For example, the network interface 650 may include a network interface card (NIC) configured to communicate according to the Ethernet protocol. Additionally, the network interface 650 may implement a TCP/IP stack for communication according to the TCP/IP protocols. Various alternative or additional hardware or configurations for the network interface 650 will be apparent.

The storage 660 may include one or more machine-readable storage media such as read-only memory (ROM), random-access memory (RAM), magnetic disk storage media, optical storage media, flash-memory devices, or similar storage media. In various embodiments, the storage 660 may store instructions for execution by the processor 620 or data upon with the processor 620 may operate.

For example, as shown, the storage 660 includes hypervisor instructions 661 for implementing a hypervisor 661 to support one or more VMs. Virtual switch instructions 662 allow the processor 620 to implement a virtual switch to exchange network traffic between virtual NICs of the VMs and the network via the network interface 650. The virtual switch instructions 662 may include instructions for implementing various functionalities as described herein such as, for example, virtual network agent instructions 663, underlay snooping instructions 664, and underlay proxy agent instructions 665. The functions of the virtual switch may be supported by various configuration data such as, for example, underlay resource permissions 666, such as those described with respect to FIGS. 4-5, and underlay resource subscriptions, such as those described with respect to FIG. 3. Various alternative sets of instructions for storage in the storage device 660 when the hardware 600 implements other devices and associated functionalities described herein will be apparent.

It will be apparent that various information described as stored in the storage 660 may be additionally or alternatively stored in the memory 630. In this respect, the memory 630 may also be considered to constitute a "storage device" and the storage 660 may be considered a "memory." Various other arrangements will be apparent. Further, the memory 630 and storage 660 may both be considered to be "non-transitory machine-readable media." As used herein, the term "non-transitory" will be understood to exclude transitory signals but to include all forms of storage, including both volatile and non-volatile memories.

While the hardware device 600 is shown as including one of each described component, the various components may be duplicated in various embodiments. For example, the processor 620 may include multiple microprocessors that are configured to independently execute the methods described herein or are configured to perform steps or subroutines of the methods described herein such that the multiple processors cooperate to achieve the functionality described herein.

Figure 7:
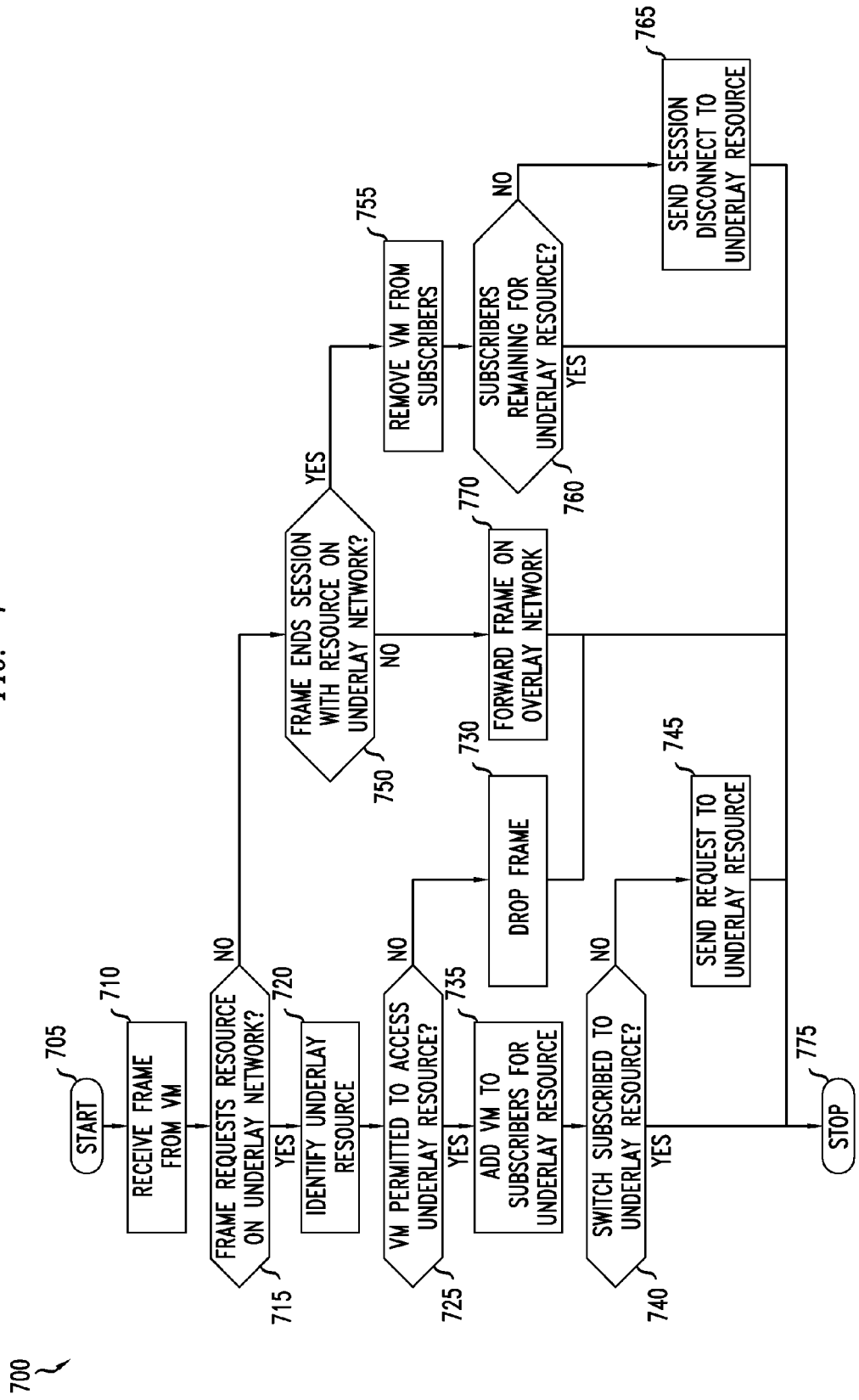
FIG. 7 illustrates an exemplary method for processing frames received from virtual machines.

FIG. 7 illustrates an exemplary method 700 for processing frames received from virtual machines. The method may be performed, for example, by a virtual switch 112, 122, 210 upon receiving an outgoing message via a VM virtual NIC. The method 700 may form at least a portion of the virtual switch instructions 662.

The method 700 begins in step 705 and proceeds to step 710 where the virtual switch receives a frame from a VM. Next, in step 715, the virtual switch determines whether the frame includes a request to initiate a session with a resource on the underlay network. For example, the virtual switch may identify the frame as including an IGMP join request. If so, the method proceeds to step 720, where the virtual switch identifies the requested underlay resource, and then to step 725, where the virtual switch determines whether the requesting VM is permitted to access the requested resource. If the VM is not permitted the access the resource, the virtual switch may simply drop the frame in step 730 and the method may proceed to end in step 775. It will be apparent that various alternative actions may be taken in step 730 such as, for example, forwarding the frame over the overlay network as is, dropping the packet, or returning an error to the VM. Such functionality for when the VM does not have permission to access the underlay resource may, in some embodiments, constitute a configuration setting for the VM, application, or overall system.

If, on the other hand, the requesting VM is permitted to access the requested resource, the method proceeds to step 735 where the virtual switch adds an identification of the VM to the subscription table at the entry for the requested resource. If such an entry does not already exist, the virtual switch may create a new entry for the requested resource. In step 740 the virtual switch determines whether it is already subscribed to the requested resource. If so, the data stream has previously been established and the method 700 may proceed to end in step 775. Otherwise, the virtual switch sends its own underlay request message in step 745 to establish the session, multicast stream, or other subscription and the method 700 may proceed to end in step 775.

If it is determined in step 715 that the frame does not request a new resource for the VM, the method proceeds to step 750 where the virtual switch determines whether the frame ends a session with a resource on the underlay network, such as a termination request for a previously requested underlay resource. For example, the virtual switch may identify the frame as including an IGMP leave message. If so, the method proceeds to step 755 where the virtual switch removes the VM from a list of subscribers for the resource. The virtual switch determines, in step 760, whether there are any subscribers remaining for the underlay resource or, in other words, whether the VM was the last remaining subscriber for the resource. If so, the virtual switch sends its own session disconnect (e.g., an IGMP leave message) to the underlay resource in step 765. The method then proceeds to end in step 775. If, on the other hand, the virtual switch determines in step 750 that the frame is not related to ending an underlay resource session, the virtual switch forwards the frame over the overlay network in step 770 and the method proceeds to end in step 775.

Various alternative implementations of the functionality described herein will be apparent. For example, in some embodiments, the virtual switch may install a snooping rule based on each VMs permissions such that only requests that match the VM's permissions are flagged to be passed to the proxy agent. In such embodiments, permission checking step 725 may be omitted.

FIG. 8 illustrates an exemplary method 800 for processing frames received from underlay resources. The method may be performed, for example, by a virtual switch 112, 122, 210 upon receiving an outgoing message via a VM virtual NIC. The method 800 may form at least a portion of the virtual switch instructions 662.

The method 800 begins in step 805 and proceeds to step 810 where the virtual switch receives a frame from an underlay resource via the underlay network. For example, the frame may be a portion of a multicast data stream to which the virtual switch previously subscribed. The virtual switch may identify the frame as such by, for example, determining that the frame was received via a VLAN that is dedicated to underlay multicast traffic or other underlay resource traffic. Next, in step 815, the virtual switch identifies any local subscriber VMs for the source underlay resource. For example, the virtual switch may locate a group entry in a subscriber table associated with the source multicast IP address. Then, in step 820, the virtual switch forwards a copy of the frame to each such identified subscriber. In this manner, multiple streams may be delivered to multiple subscriber VMs while only a single stream portion actually terminated at the virtual switch. The method proceeds to end in step 825.

FIG. 9 illustrates an exemplary method 900 for migrating virtual machines. The method may be performed, for example, by a hypervisor or virtual switch 112, 122, 210 upon receiving an instruction to receive a migrating VM. The method 900 or a portion thereof may form at least a portion of the hypervisor instructions 661 or virtual switch instructions 662.

The method begins in step 905 and proceeds to step 910 where the device establishes the migrated VM on the local hypervisor. Then, in step 915, the device receives underlay resource subscriptions for the migrated VM. For example, in various embodiments, upon establishing proxy connections for each underlay resource, the proxy agent may transmit an identification of the subscribed resource in connection with a VM identifier to the policy server. The policy server may then provide this information to the receiving device upon request after migration. As another alternative, the device may send one or more IGMP generic message queries to the migrated VM to force the guest operating system to refresh the list of multicast groups that its interested in receiving and thereby discern the underlay resource subscriptions held by the VM prior to migration.

Next, in step 920, the device adds the migrated VM to subscriber groups for each underlay resource identified by the underlay resource subscription information obtained in step 915. Step 920 may include creating any appropriate new subscription group records. Next in step 925, the device determines whether the virtual switch is not yet subscribed to any of the underlay resources identified by the resource subscription information obtained in step 915. If the virtual switch is already subscribed to all such underlay resources, the method proceeds to end in step 935. Otherwise, the virtual switch sends any appropriate requests to underlay resources to establish proxy sessions for the migrated VM. The method then proceeds to end in step 935.

According to the foregoing, various embodiments enable providing VMs with access to various resources, such as IGMP multicast streams, that are not connected to an overlay network over which the VMs normally communicate. In particular, by providing a virtual switch with a proxy agent, the hypervisor and virtual switch associated with the VMs can access the networks via the underlay network on behalf of the requesting VM, thereby avoiding the need to add the requested resource to the overlay network. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory computer-readable storage medium encoded with instructions for execution by a server, the non-transitory computer-readable storage medium comprising:
    instructions for supporting virtual machines;
    instructions for providing a virtual switch between the virtual machines and a datacenter network, wherein the datacenter network includes an overlay network supported by an underlay network;
    instructions for monitoring traffic by the virtual switch to identify virtual machine requests for underlay resources which are inaccessible via the overlay network; and
    instructions for providing an underlay resource proxy for the virtual machines, including instructions for sending proxy requests to the underlay resources via the datacenter network on behalf of the virtual machines identified as requesting the underlay resources, whereby the proxy requests identify the underlay resource proxy as a requestor, and instructions for forwarding underlay resource responses to the virtual machines that previously requested associated underlay resources, wherein an internet protocol (IP) address configured in a virtual switch hides a real number of virtual machines that are connected behind the virtual switch, the underlay resources comprise multicast sources, the virtual machine requests and proxy requests comprise multicast join messages, and the underlay resource responses comprise multicast traffic from the multicast sources.

2. The non-transitory computer-readable storage medium of claim 1, further comprising:
    instructions for retrieving policy data from a policy server, the policy data being associated with permission information of a requestor virtual machine;
    instructions for, after identifying a virtual machine request for an underlay resource, determining whether the requestor virtual machine is authorized to access the requested underlay resource, wherein the instructions for providing the underlay resource proxy for the virtual machines further include instructions for denying proxy functionality when the requestor virtual machine is not authorized to access the requested underlay resource.

3. The non-transitory computer-readable storage medium of claim 1, further comprising:
    instructions for maintaining correspondences between the virtual machines and the underlay resources to which respective virtual machines are subscribed, wherein the instructions for sending the proxy requests to the underlay resources via the datacenter network on behalf of the virtual machines are configured to be performed when the correspondences indicate that no virtual machines were subscribed to a respective underlay resource prior to the virtual switch receiving the virtual machine request for the underlay resource.

4. The non-transitory computer-readable storage medium of claim 3, further comprising:
    instructions for identifying the virtual machine requests to end sessions with the underlay resources;
    instructions for, upon identifying a virtual machine request to end a session with an underlay resource, deleting a correspondence between the virtual machine and the underlay resource;
    instructions for determining whether, after deleting the correspondence between the virtual machine and the underlay resource, the correspondences indicate that no virtual machine remains subscribed to the underlay resource; and
    instructions for, when the correspondences indicate that no virtual machine remains subscribed to the underlay resource, sending a proxy request to end the session between the underlay resource proxy and the underlay resource.

5. The non-transitory computer-readable storage medium of claim 1, further comprising:
    instructions for, after sending a proxy request, sending virtual machine subscription information to a network controller; and
    instructions for establishing a migrated virtual machine on the server; including:
    instructions for receiving the virtual machine subscription information for the migrated virtual machine from the network controller; and
    instructions for executing the instructions for sending the proxy requests to the underlay resources based on the received virtual machine subscription information for the migrated virtual machine.

6. The non-transitory computer-readable storage medium of claim 1, further comprising:
    instructions for establishing a migrated virtual machine on the server, including:
    instructions for transmitting a query to the migrated virtual machine;
    instructions for receiving virtual machine subscription information from the virtual machine in response to the query; and
    instructions for executing the instructions for sending the proxy requests to the underlay resources based on the received virtual machine subscription information for the migrated virtual machine.

7. A method performed by a server in a data center comprising an overlay network supported by an underlay network, the method comprising:
    exchanging messages between a virtual machine and the overlay network;
    identifying a request message transmitted by the virtual machine supported by the server as requesting an underlay resource that is inaccessible via the overlay network;
    sending a proxy request to the underlay resource via the underlay network;
    receiving, at the server, at least one message from the underlay resource in response to the proxy request; and
    forwarding the at least one message to the virtual machine based on determining that the virtual machine previously requested the underlay resource, wherein an internet protocol (IP) address configured in a virtual switch hides a real number of virtual machines that are connected behind the virtual switch, the underlay resource comprises a multicast source, the request message and the proxy request comprise requests to join a multicast group of the multicast source, and the at least one message from the underlay resource comprises multicast traffic from the multicast source.

8. The method of claim 7, further comprising:
identifying an additional request message transmitted by an additional virtual machine supported by the server as requesting the underlay resource; and
forwarding the received at least one message to the additional virtual machine based on determining that the additional virtual machine previously requested the underlay resource.

9. The method of claim 7, further comprising:
retrieving policy data from a policy server, the policy data being associated with permission information of a requestor virtual machine; and
determining whether the requestor virtual machine is authorized to access the underlay resource, wherein the forwarding is performed based on determining that the requestor virtual machine is authorized to access the underlay resource.

10. The method of claim 7, further comprising:
adding the virtual machine to an identification of virtual machines subscribed to the underlay resource, wherein the sending the proxy request is performed based on determining that no virtual machines were subscribed to the underlay resource prior to the adding.

11. The method of claim 10, further comprising:
identifying a terminate message transmitted by the virtual machine, requesting that a session with the underlay resource be terminated;
removing the virtual machine from the identification of virtual machines subscribed to the underlay resource; and
sending a proxy terminate message to the underlay resource via the underlay network based on determining that no virtual machines will be subscribed to the underlay resource after the removing.

12. The method of claim 7, further comprising:
establishing a migrated virtual machine on the server;
receiving virtual machine subscription information from the migrated virtual machine; and
sending the proxy request to underlay resources based on the received virtual machine subscription information for the migrated virtual machine.

13. The method of claim 12, further comprising:
transmitting a query to the migrated virtual machine; and
receiving the virtual machine subscription information from the migrated virtual machine in response to the query.

14. A server for deployment in a datacenter, the server comprising:
a network interface configured to communicate with a datacenter network that includes an overlay network supported by an underlay network;
a memory; and
a processor in communication with the network interface and the memory, wherein the processor is configured to support virtual machines, provide a virtual switch between the virtual machines and the datacenter network, wherein the datacenter network includes the overlay network supported by the underlay network, monitor traffic by the virtual switch to identify virtual machine requests for underlay resources which are inaccessible via the overlay network, and provide an underlay resource proxy for the virtual machines, configured to send proxy requests to the underlay resources via the datacenter network on behalf of the virtual machines identified as requesting the underlay resources, whereby the proxy requests identify the underlay resource proxy as a requestor, and forward underlay resource responses to the virtual machines that previously requested the underlay resources, wherein an internet protocol (IP) address configured in the virtual switch hides a real number of virtual machines that are connected behind the virtual switch, the underlay resources comprise multicast sources, the virtual machine requests and the proxy requests comprise multicast join messages, and the underlay resource responses comprise multicast traffic from the multicast sources.

15. The server of claim 14, wherein the processor is further configured to retrieve policy data from a policy server, the policy data being associated with permission information of a requestor virtual machine, after identifying a virtual machine request for an underlay resource, determine whether the requestor virtual machine is authorized to access the requested underlay resource, and in providing an underlay resource proxy for the virtual machines, denying proxy functionality when the requestor virtual machine is not authorized to access the requested underlay resource.

16. The server of claim 14, wherein the processor is further configured to maintain correspondences between the virtual machines and the underlay resources to which the respective virtual machines are subscribed, and in sending the proxy requests to the underlay resources via the datacenter network on behalf of the virtual machines, send proxy requests when the correspondences indicate that no virtual machines were subscribed to a respective underlay resource prior to the virtual switch receiving a virtual machine request for the underlay resource.

17. The server of claim 16, wherein the processor is further configured to identify virtual machine requests to end sessions with the underlay resources, upon identifying the virtual machine request to end a session with the underlay resource, delete a correspondence between the virtual machine and the underlay resource, determine whether, after deleting the correspondence between the virtual machine and the underlay resource, the correspondences indicate that no virtual machine remains subscribed to the underlay resource, and when the correspondences indicate that no virtual machine remains subscribed to the underlay resource, send another proxy request to end the session between the underlay resource proxy and the underlay resource.

* * * * *